US009457682B2

(12) United States Patent
Twarog et al.

(10) Patent No.: US 9,457,682 B2
(45) Date of Patent: Oct. 4, 2016

(54) METHOD FOR PREDICTING CHARGING PROCESS DURATION

(71) Applicant: GM GLOBAL TECHNOLOGY OPERATIONS LLC, Detroit, MI (US)

(72) Inventors: Christopher J. Twarog, Franklin, MI (US); Ian L. Hanna, Clarkston, MI (US); Trista K. Schieffer, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 14/015,120

(22) Filed: Aug. 30, 2013

(65) Prior Publication Data

US 2015/0066837 A1   Mar. 5, 2015

(51) Int. Cl.
*H02J 7/04* (2006.01)
*B60L 11/18* (2006.01)
*G06N 5/02* (2006.01)
*H01M 10/44* (2006.01)
*H01M 10/48* (2006.01)

(52) U.S. Cl.
CPC .......... *B60L 11/1851* (2013.01); *B60L 11/187* (2013.01); *B60L 11/1861* (2013.01); *G06N 5/02* (2013.01); *H01M 10/443* (2013.01); *B60L 2240/545* (2013.01); *B60L 2240/662* (2013.01); *B60L 2250/14* (2013.01); *B60L 2250/16* (2013.01); *B60L 2260/50* (2013.01); *B60L 2260/52* (2013.01); *B60L 2260/56* (2013.01); *H01M 10/44* (2013.01); *H01M 10/48* (2013.01); *H01M 10/486* (2013.01); *H01M 2220/20* (2013.01); *Y02T 10/7005* (2013.01); *Y02T 10/705* (2013.01); *Y02T 10/7044* (2013.01); *Y02T 10/7291* (2013.01); *Y02T 90/16* (2013.01)

(58) Field of Classification Search
CPC ............................ B60L 11/1851; G06N 5/02
USPC ......................................................... 320/149
See application file for complete search history.

(56) References Cited

U.S. PATENT DOCUMENTS

2012/0256752 A1* 10/2012 Musser ................... H02J 7/047
340/636.2
2014/0084873 A1* 3/2014 Sim ..................... H01M 10/443
320/134

* cited by examiner

*Primary Examiner* — Vuthe Siek
(74) *Attorney, Agent, or Firm* — Reising Ethington P.C.; Lionel D. Anderson

(57) ABSTRACT

A method for predicting the duration of a future charging process for a vehicle battery. The method comprises estimating a future charge amount of the battery corresponding to the start of the future charging process. The method further comprises estimating a future temperature of the battery. The method still further comprises determining a future charging power or a characteristic thereof to be applied to the battery during the future charging process, wherein the future charging power or characteristic thereof is based on the estimated future charge amount and the estimated future temperature and is representative of a charging amount or characteristic thereof that will maintain the temperature of the battery at or below a threshold temperature during the future charging process. The method still further comprises predicting a duration of the future charging process based on the estimated future charge amount and the determined future charging power or characteristic thereof.

20 Claims, 7 Drawing Sheets

METHOD FOR PREDICTING CHARGING PROCESS DURATION

FIELD

The present invention generally relates to a plug-in electric vehicle and, more particularly, to a method for predicting the duration of one or more future charging processes for a battery of a plug-in electric vehicle.

BACKGROUND

Plug-in electric vehicles may be charged in a number of different ways with a variety of different power sources and charging arrangements. One particular way in which a plug-in electric vehicle may be charged is via an external high-voltage charger, such as one that is part of a charging station or kiosk and provides 200V-600V of DC power. One advantage of charging a plug-in electric vehicle with an external high-voltage charger is the rapid rate of charging. This type of charging arrangement, which is also called "fast charging," can significantly reduce charging times as it may provide between 10 kW-300 kW of charging power. The term "fast charging," as used herein, includes any charging event or arrangement where an external power source charges a plug-in electric vehicle with a charge rate that exceeds the C-Rate of the vehicle's battery (i.e., the theoretical amount of current the battery can deliver when discharged in one hour to the point of 100% depth of discharge). For example, if the vehicle battery has a C-Rate of 45 Amp-hours, then any charging event exceeding 45 Amps could be considered a "fast charging" event.

Conventionally, the duration of a future fast charging process may be quoted based on a nominal battery temperature. However, as battery temperature varies during, for example, a drive cycle leading up to the performance of the charging process, the amount of time required to complete the charging process may be significantly longer or shorter than the quoted duration. This may be because, for example, some of the power provided by the charging station that would ordinarily be applied to the battery for charging purposes may be diverted to a thermal management system used to cool the battery. To avoid providing a vehicle user a prediction of a charging process duration that may be wholly inaccurate, such a prediction is often not made until after the charging process commences to allow for a more accurate battery temperature to be obtained, which may then be used instead of a nominal temperature to predict the duration of the charging process.

While possibly providing a more accurate prediction of charging process duration as compared to conventional techniques that use a nominal battery temperature, one drawback of this technique is that the prediction cannot be made until after the charging process commences. As a result, the vehicle user does not know how long the charging process will take ahead of time, and therefore, cannot factor it into his/her trip planning. As such, the amount of time a trip may take may be significantly different (increased) from what the user expects due to the unknown amount of time that may be added to the trip due to the performance of one or more charging processes.

SUMMARY

According to one embodiment, there is provided a method for predicting the duration of a future charging process for a vehicle battery. The method may comprise the steps of: estimating a future charge amount of the vehicle battery corresponding to the start of the future charging process; estimating a future temperature of the vehicle battery; determining a future charging power or a characteristic thereof to be applied to the vehicle battery during the future charging process, wherein the future charging power or characteristic thereof is based on the estimated future charge amount and the estimated future temperature and is representative of a charging power or characteristic thereof (e.g., a maximum charging power or characteristic thereof) that will maintain the temperature of the battery at or below a threshold temperature during the future charging process; and predicting a duration of the future charging process based on the estimated future charge amount and the determined future charging power or characteristic thereof.

According to another embodiment, there is provided a method for predicting the duration of a future charging process for a vehicle battery. The method may comprise the steps of: estimating a future charge amount of the vehicle battery corresponding to the start of the future charging process; estimating a future temperature of the vehicle battery corresponding to the end of the future charging process; determining a future charging power or characteristic thereof to be applied to the vehicle battery during the future charging process based on the estimated future charge amount and the estimated future temperature; and predicting a duration of the future charging process based on the estimated future charge amount and the determined future charging power or characteristic thereof.

According to yet another embodiment, there is provided a method for predicting the duration of a future charging process for a vehicle battery. The method may comprise the steps of: determining a distance to a charging location at which the future charging process is to be performed using a planned route to be followed by the vehicle; estimating a future charge amount of the vehicle battery corresponding to the start of the future charging process based at least in part on the distance to the charging location; estimating a future temperature of the vehicle battery based at least in part on the distance to the charging location; determining a future charging power or a characteristic thereof (e.g., a maximum charging power or characteristic thereof) to be applied to the vehicle battery during the future charging process, wherein the future charging power or characteristic thereof is based on the estimated future charge amount and the estimated future temperature and is representative of a charging power or characteristic thereof that will maintain the temperature of the battery at or below a threshold temperature during the future charging process; and predicting a duration of the future charging process based on the estimated future charge amount and the determined future charging power or characteristic thereof.

DRAWINGS

Preferred illustrative embodiments will hereinafter be described in conjunction with the appended drawings, wherein like designations denote like elements, and wherein.

Figure 1:
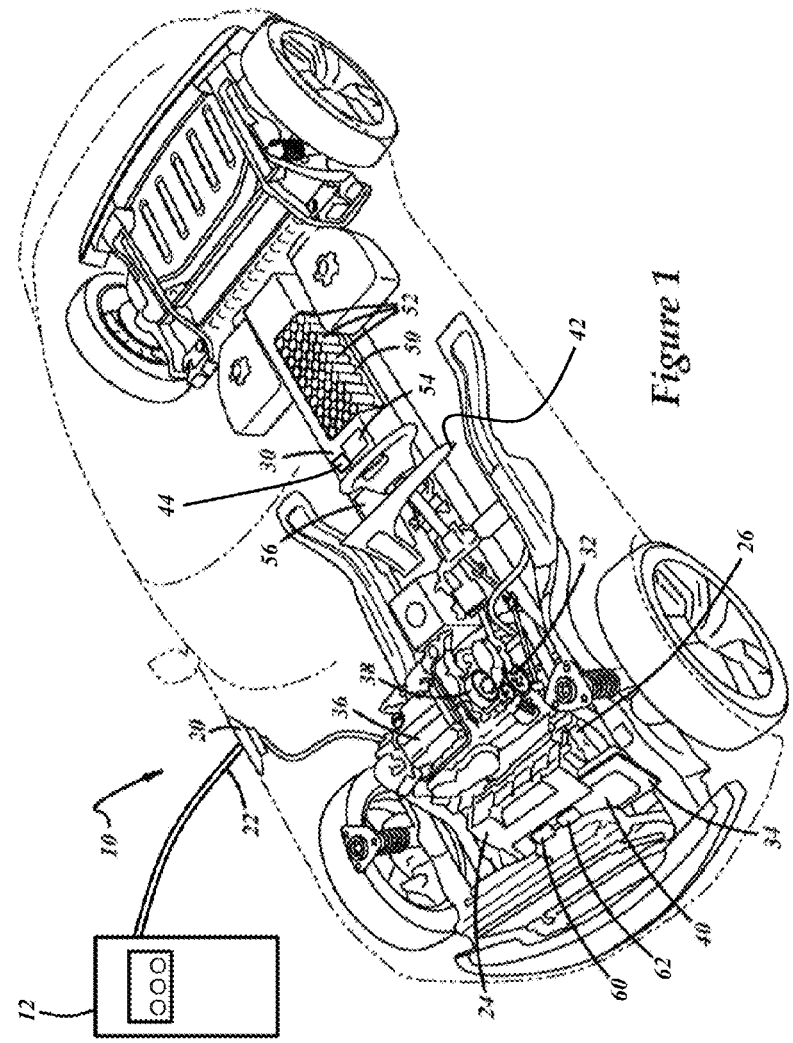
FIG. 1 is a schematic view of an illustrative plug-in electric vehicle that may utilize the system and method disclosed herein.
Figure 2:
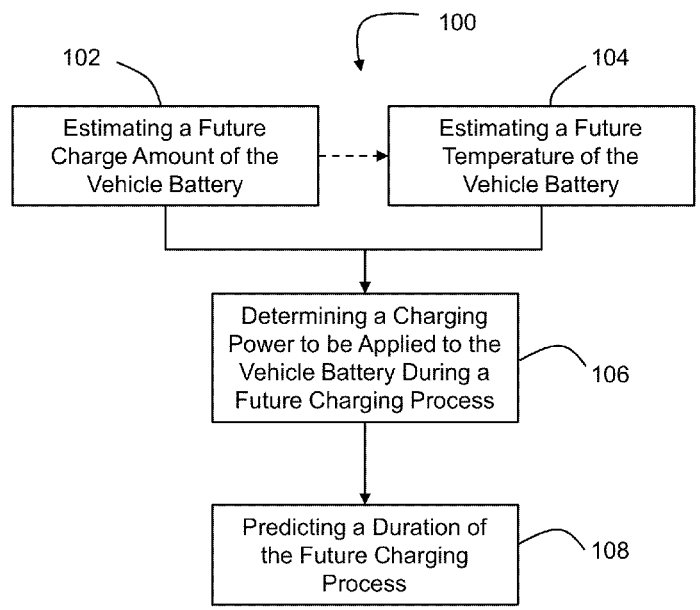
FIG. 2 is a flowchart of an illustrative embodiment of a method that may be used to predict the duration of one or more future charging processes for a plug-in electric vehicle, such as the one shown in FIG. 1.
Figure 4:
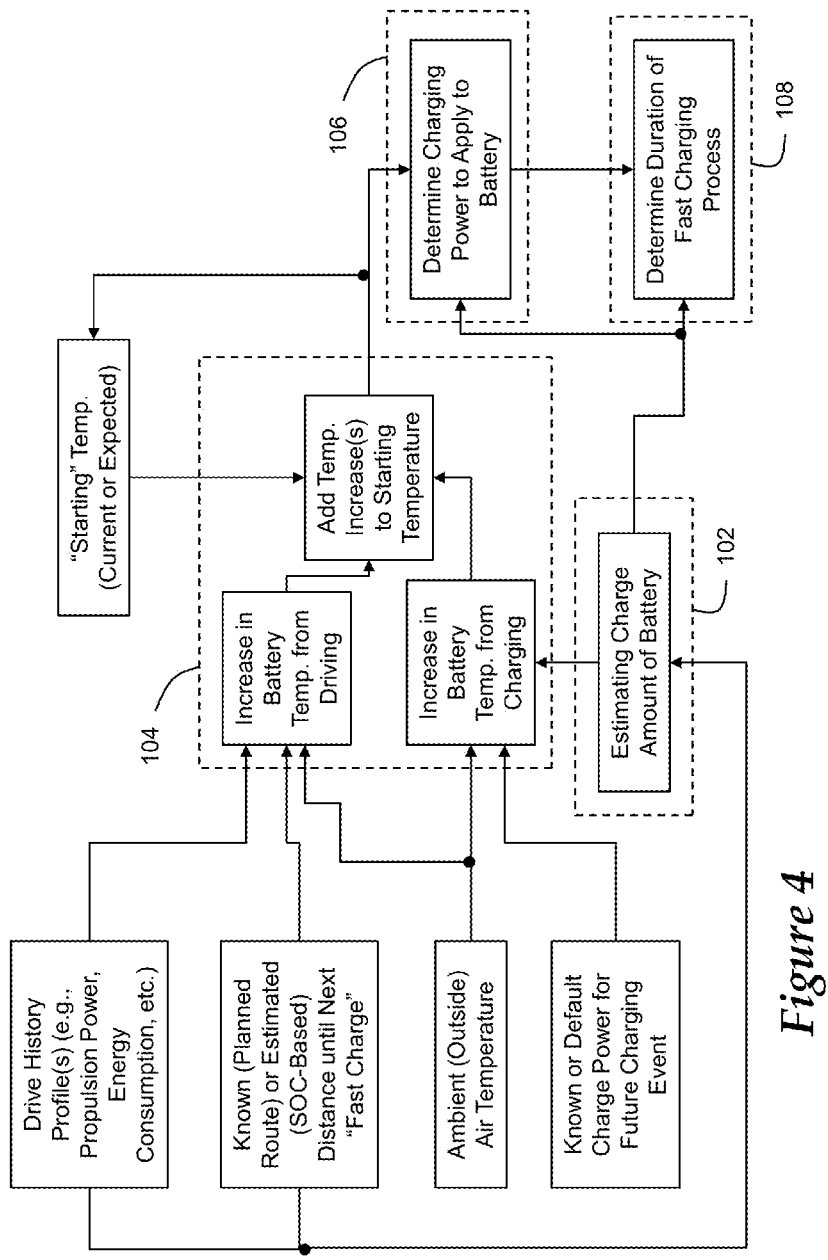
Figure 5A:
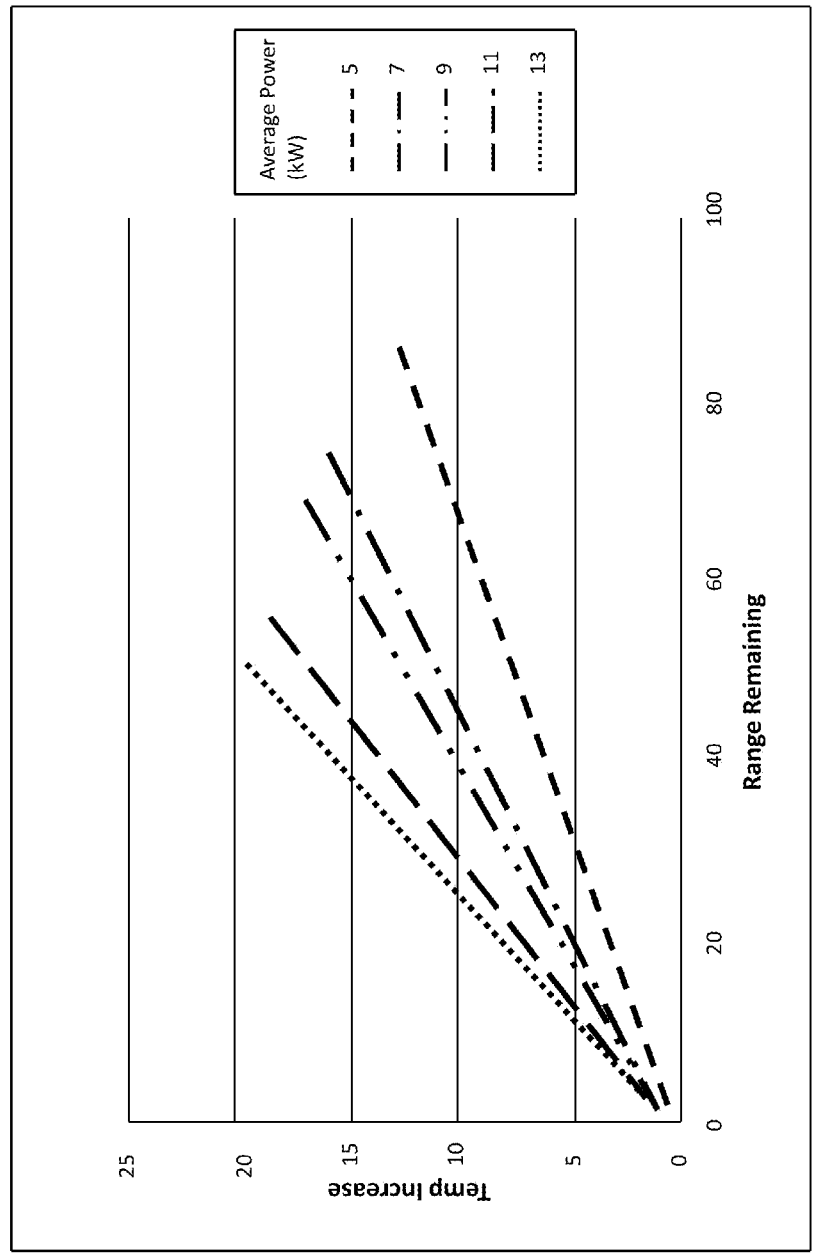
Figure 5B:
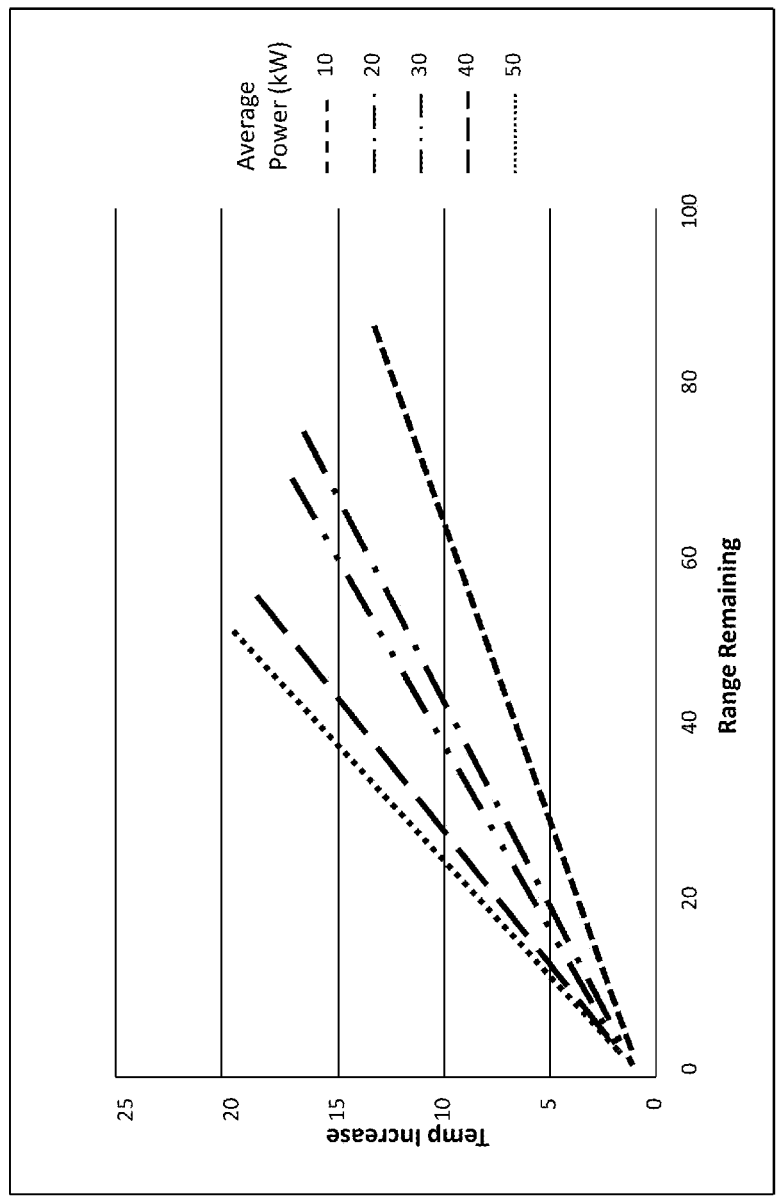
Figure 5C:
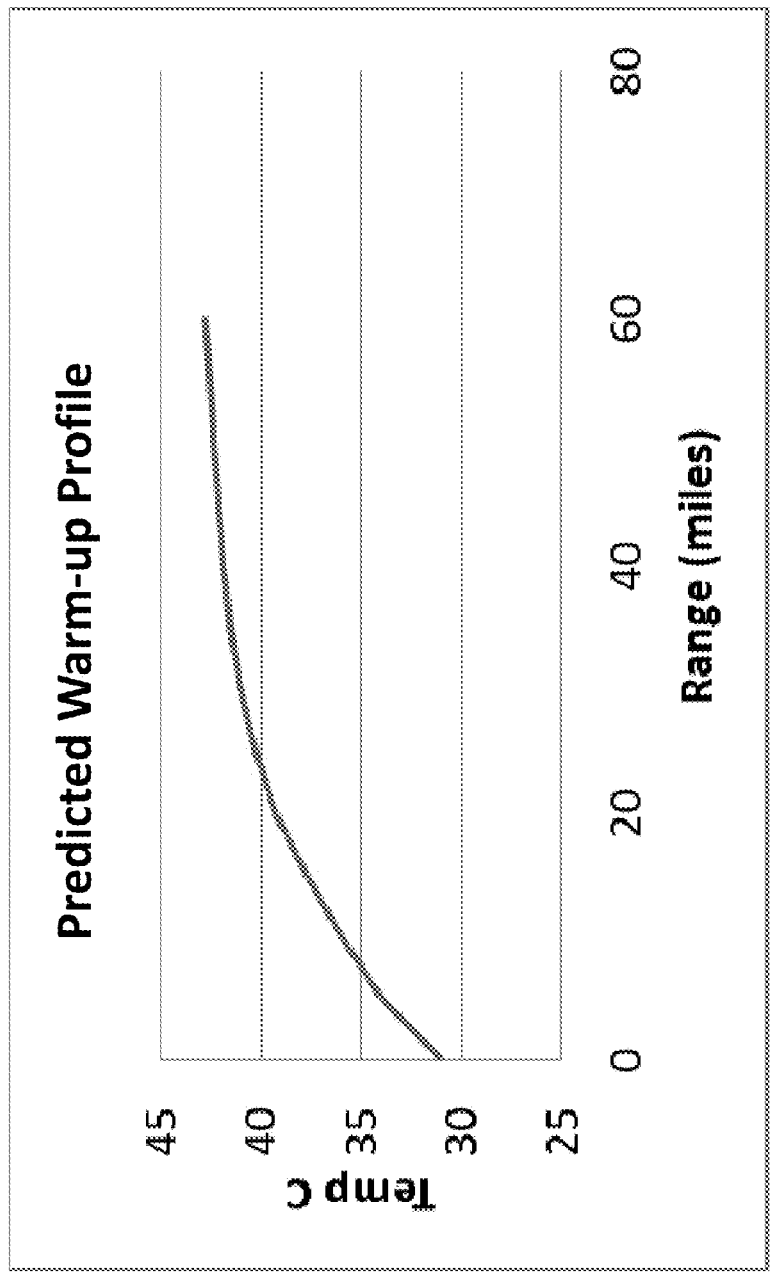
Figure 5D:
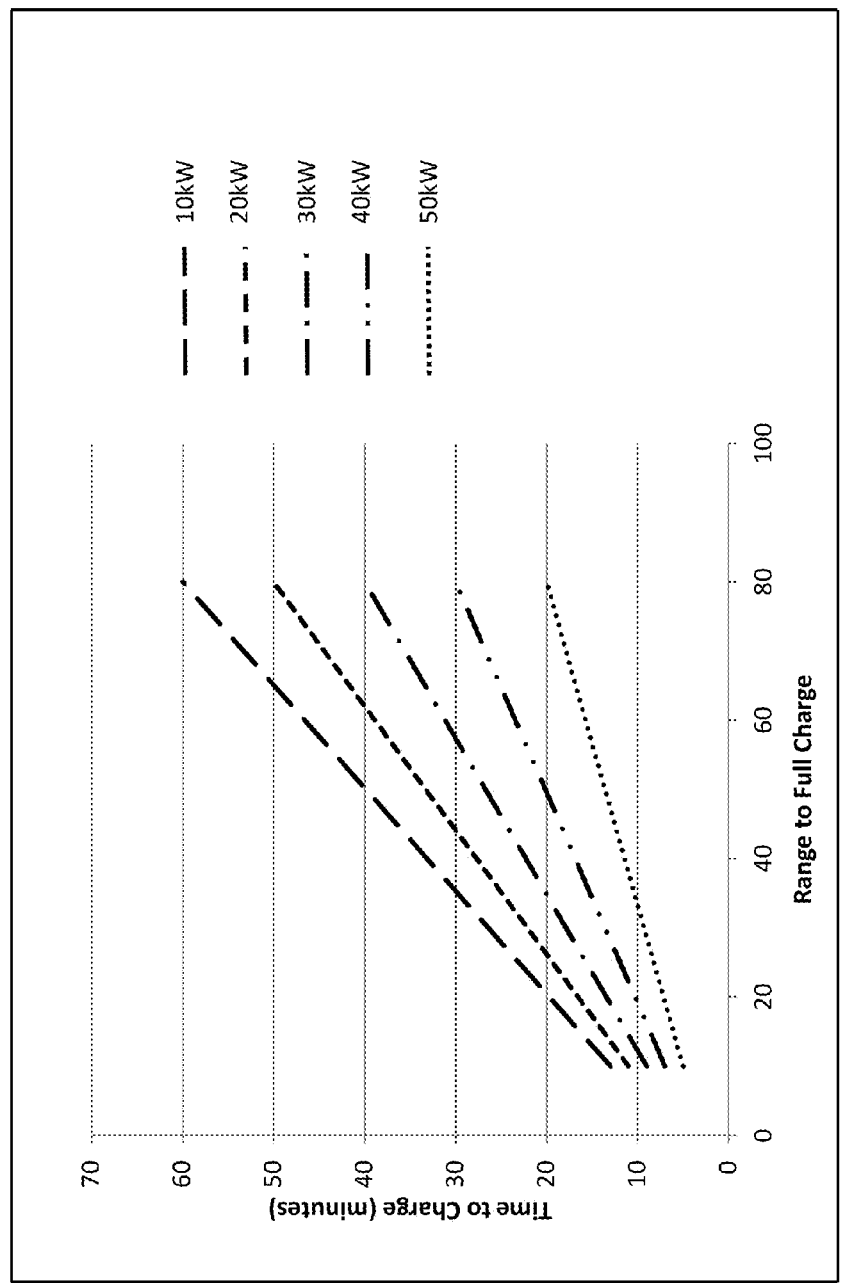

FIG. 4 is block diagram of an illustrative embodiment of an algorithm for predicting the duration of one or more future charging processes for a plug-in electric vehicle, such as the one shown in FIG. 1, and that may be utilized by the method shown in FIG. 2; and FIGS. 5A-5D are representations of look-up tables or profiles that may be used in various steps of the method shown in FIG. 2 and by the algorithm shown in FIG. 4.

DESCRIPTION

The system and method described herein may be used to predict the duration of one or more future charging processes of a battery of a plug-in electric vehicle. More particularly, in an embodiment, the system and method may be used to predict the duration of one or more future fast charging processes (e.g., charging processes that supply 10 kW-300 kW of charging power) of a vehicle battery. According to an illustrative embodiment, the method uses estimates of a future charge amount of the vehicle battery corresponding to the start of a future charging process and a future temperature of the vehicle battery corresponding to the end of the future charging process to determine a future charging power or a characteristic thereof (e.g., charging current or charging rate) to be applied to the vehicle battery during the future charging process. Using the determined future charging power or characteristic thereof and the estimated future charge amount of the vehicle battery, the charging method may predict the duration of the future charging process, and do so with accuracy and precision. In this way, the system and method enable a user to know the length of time a trip requiring one or more charging processes will take before beginning the trip, and therefore, enable the user to plan his/her trip accordingly.

With reference to FIG. 1, there are shown some of the components of an illustrative plug-in electric vehicle 10 that may be used with the charging method described herein. Although the following description is provided in the context of a particular plug-in electric vehicle, it should be appreciated that this vehicle is merely one example and that other vehicles may certainly be used instead. For example, the charging system and method described below can be used with any type of plug-in electric vehicle that obtains electrical power from some off-board or external power source, including a plug-in hybrid electric vehicle (PHEV), a battery electric vehicle (BEV), an extended-range electric vehicle (EREV), a plug-in electric vehicle that uses conducive charging with cords or cables, or a plug-in electric vehicle that uses inductive charging without cords or cables, to cite a few possibilities. According to an embodiment, plug-in electric vehicle 10 interacts with an external power source 12 and includes, among other components, a power connection 20, a battery charger 24, isolation hardware 26, a battery 30, an electric motor 32, an inverter/converter 34, an engine 36, a generator 38, a control module 40, a user interface 42, and a navigation module 44. Because many of the components of plug-in vehicle 10 are generally known in the art, and because many different components and arrangements may be used with the present method, a brief explanation of the aforementioned components is provided here in lieu of a detailed recitation of their individual structure and functionality.

External power source 12 provides the plug-in electric vehicle with high levels of electrical power and may be one of a number of different power supply types known in the art. According to an illustrative embodiment, external power source 12 is an off-board, high-voltage power source that is part of a dedicated charging station or kiosk and provides plug-in electric vehicle 10 with high-voltage DC power (e.g., 200V-600V) for fast charging. External power source 12 may be designed to provide a relatively constant power level to plug-in electric vehicle 10 so that as voltage increases, the amperage correspondingly decreases. In another embodiment, external power source 12 is an off-board high-amperage power source that provides the plug-in electric vehicle with high-amperage DC or AC power (e.g., 50 A-500 A). External power source 12 may be coupled to a public electric utility or it may be powered by renewable energy from solar panels, wind turbines, hydroelectric means, biomass, etc.; it may provide AC or DC power; it may be high-voltage, high-amperage or both; or it may engage in conductive charging over cables or inductive coupling through the air, to cite several possibilities. External power source 12 is not limited to any particular type or embodiment, so long as it can provide high power levels (e.g., 10 kW-300 kW) to plug-in electric vehicle 10.

Power connection 20 is an electrical inlet or socket on the plug-in electric vehicle into which the power coupler is inserted or connected. This enables a vehicle owner to easily connect and disconnect plug-in electric vehicle 10 to and from a charging point, like external power source 12. Power connection 20 is not limited to any particular design or configuration, and may be any type of inlet, connection, socket, plug, port, receptacle, etc., including those that are based on conductive, inductive and/or other types of electrical connections. Some of these connection types conform to international standards (e.g., IEC 62196, SAE J1772, CHAdeMO, etc.). In an embodiment, power connection 20 is a high-voltage electrical inlet located on the exterior of plug-in electric vehicle 10 so that it can be easily accessed (e.g., under a hinged door or flap), and includes connections for conveying electrical power to the vehicle, as well as communication or control signals. Other arrangements and embodiments are certainly possible.

Power coupler 22 connects the external power source to the power connection, and can be of any suitable type or configuration. Power coupler 22—sometimes referred to as an electric vehicle supply equipment (EVSE) cordset—may be a specialized cordset that is specifically designed for use with plug-in electric vehicles (such as those described in specifications SAE J-1772 and J-1773), and includes a first end, a cable or cord, a control unit, and a second end. The first end of power coupler 22 plugs into external power source 12 and the second end is a specifically designed connection that plugs into power connection 20 on the plug-in electric vehicle. The cable provides electrical power from external power source 12 to plug-in electric vehicle 10, but may also convey one or more communication signals between a control unit of power coupler 22 and devices located on the vehicle, like control module 40. The control unit in power coupler 22 may include any number of electronic components including, but certainly not limited to, sensors, transceivers, processing devices, memory devices, contactors, switches, ground fault circuit interrupter (GFCI) components, as well as any other suitable component. In an embodiment, the control unit in power coupler 22 monitors various conditions surrounding the power coupler (e.g., the presence of electrical power, voltage, current and/or power levels, the temperature of the power coupler, etc.), and communicates with control module 40 regarding such conditions. Skilled artisans should appreciate that the system and method described herein are not limited to any particular power coupler or cordset, as any number of different power couplers could be used.

Battery charger 24 may receive electrical power from a variety of sources, including external and/or internal power sources, and uses this power to charge the battery. In the case of an external power supply, battery charger 24 may receive electrical power from external power source 12 through power coupler 22 and connection 20, as already explained. In the case of an internal power supply, battery charger 24 may receive electrical power from regenerative braking, a motor-driven generator 38, or some other internal source via electrical connections within the vehicle. Skilled artisans will appreciate that battery charger 24 may be provided according to any number of different embodiments, may be connected in any number of different configurations, and may include any number of different components, such as transformers, rectifiers, switching power supplies, filtering means, cooling means, sensors, control units and/or any other suitable components known in the art.

Isolation hardware 26 is connected to the power connection and may isolate, control and/or otherwise route electrical power from the external power source to different devices within the plug-in electric vehicle. For example, isolation hardware 26 may be coupled to power connection 20 and designed to receive high-voltage power from external power source 12 and directly deliver the high-voltage power to battery 30, without going through the normal charging path or channels. By-passing certain components, such as battery charger 24, for example, may be desirable if those components are not equipped to handle such high voltage, amperage and/or power levels. Moreover, isolation hardware 26 may have contactors and/or other electrical components that isolate and protect both users and other vehicle devices from the high power levels provided by external power source 12. The plug-in electric vehicle may also include lower voltage hardware for when the vehicle is being charged by a traditional power source with lower voltage and power sources. In some embodiments, isolation hardware 26 has relays, contactors, transistors (e.g., field-effect transistor (FET), etc.), or some combination thereof.

Battery 30 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including, but certainly not limited to, the one schematically shown here which includes a battery pack 50, battery cells 52, one or more battery sensors 54, and a battery control unit 56. Battery pack 50 is a high-voltage battery pack and may include a collection of identical or individual battery cells 52 connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. According to an illustrative embodiment, battery pack 50 is based on lithium-ion technology and provides approximately 40V-600V, depending on its particular design and application. For example, a heavy truck using a two-mode hybrid system may require a battery pack capable of providing high voltage levels, where a lighter vehicle may need lower voltage levels. In another embodiment, battery 30 is part of a belt-alternator-starter (BAS) or BAS-plus type system and thus only requires a battery pack providing lower voltage levels. In any case, battery pack 50 should be designed to withstand repeated charge and discharge cycles and to receive electrical energy from external power source 12. Skilled artisans will appreciate that the system and method shown and described herein are not limited to any one particular type of battery, chemistry and/or arrangement, as a number of different battery types could be employed.

Battery sensors 54 may include any combination of hardware and/or software components capable of monitoring battery conditions such as battery temperature, battery voltage, battery current, battery state-of-charge (SOC), battery state-of-health (SOH), ambient temperature, etc. These sensors may be integrated within unit 30 (e.g., an intelligent or smart battery), they may be external sensors located outside of the battery unit, or they may be provided according to some other known arrangement. Battery sensors 54 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 54 may be provided to battery control unit 56, battery charger 24, control module 40, or some other appropriate device.

Battery control unit 56 may include any variety of electronic processing devices, memory devices, input/output (I/O) devices, and other known components, and may perform various control and/or communication related functions. For example, battery control unit 56 may receive sensor signals from various battery sensors 54, package the sensor signals into an appropriate sensor message, and send the sensor message to control module 40 over a communication bus or the like. It is possible for battery control unit 56 to gather battery sensor readings and store them in local memory so that a comprehensive sensor message can be provided to control module 40 at a later time, or the sensor readings can be forwarded to module 40 or some other destination as soon as they arrive at the battery control unit, to cite a few possibilities. Instead of sending the battery sensor readings to control module 40 for subsequent processing, it is possible for battery control unit 56 to process or analyze the sensor readings itself. In another capacity, battery control unit 56 can store pertinent battery characteristics and background information pertaining to the battery's cell chemistry, cell capacity, upper and lower battery voltage limits, battery current limits, battery temperature limits or thresholds, temperature profiles, battery impedance, drive history profiles (e.g., RMS current, accessory loads, propulsion power, energy consumption, etc. corresponding to one or more recent drives), number or history of charge/discharge events (including, for example, the distance traveled between charge events), etc. Alternatively, some or all of this information may be stored and/or monitored in another component of plug-in electric vehicle 10, such as, for example, control module 40. In certain embodiments, battery control unit 56 may be configured to perform one or more steps of the method described below.

Electric motor 32 may use electrical energy stored in battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Hybrid vehicle 10 is not limited to any one particular type of electric motor, as many different motor types, sizes, technologies, etc. may be used. In one example, electric motor 32 includes an AC motor (e.g., a three-phase or other multi-phase AC induction motor, etc.), as well as a generator that can be used during regenerative braking. Electric motor 32 may be provided according to any number of different embodiments (e.g., AC or DC motors, brushed or brushless motors, permanent magnet motors, etc.), it may be connected in any number of different configurations, and it may include any number of different components, like cooling features, sensors, control units and/or any other suitable components known in the art.

Inverter/converter 34 may act as an intermediary between battery 30 and electric motor 32, as these two devices are often times designed to function according to different operational parameters. For example, during vehicle propulsion inverter/converter 34 may step-up the voltage from battery 30 and convert the current from DC to AC in order to drive electric motor 32, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the embodiment illustrated in FIG. 1, inverter and converter units are integrated into a single bi-directional device; however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Engine 36 may drive generator 38 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 36 is a small fuel-efficient engine (e.g., a small displacement, turbo-charged four-cylinder engine) that uses its mechanical output to turn generator 38. Skilled artisans will appreciate that engine 36 may be provided according to any number of different embodiments, may be connected in any number of different configurations (e.g., engine 36 could be part of a parallel hybrid system where the engine is also mechanically coupled to the vehicle wheels instead of exclusively being used to generate electricity), and may include any number of different components, like sensors, control units and/or any other suitable components known in the art.

Generator 38 is mechanically coupled to engine 36 so that the mechanical output of the engine causes the generator to create electrical power that may be provided to battery 30, electric motor 32, or both. It is worth noting that generator 38 may be provided according to any number of different embodiments (e.g., the generator of motor 32 and generator 38 may be combined into a single unit), may be connected in any number of different configurations, and may include any number of different components, like sensors, control units and/or any other suitable components known in the art. Generator 38 is not limited to any specific generator type or embodiment.

Control module 40 may be used to control, govern, or otherwise manage certain operations or functions of plug-in electric vehicle 10 and, according to one illustrative embodiment, includes a processing device 60 and a memory device 62. Processing device 60 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 62 may include any type of suitable electronic memory means and may store a variety of data and information. This includes, for example: sensed battery conditions; drive history profiles (e.g., RMS current, accessory loads, propulsion power (e.g., average propulsion power, energy consumption), etc. corresponding to one or more recent drives); look-up tables and other data structures; temperature limits or threshold values; default or standard charging power values (e.g., the nominal or default charging power that a charging station may provide) or values of characteristics thereof (e.g., charging current, charging rate, etc.); software, firmware, programs, algorithms, scripts, and other electronic instructions; component characteristics and background information; etc., some or all of which may be used in the performance of the present method. The present method—as well as any other electronic instructions and/or information needed for such tasks—may also be stored or otherwise maintained in memory device 62. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible.

Depending on the particular embodiment, control module 40 may be a stand-alone electronic module (e.g., a battery charging control module, a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities. Control module 40 is not limited to any particular type, kind or configuration.

User interface 42 may include any combination of hardware, software and/or other components that enable a vehicle user to exchange information or data with the vehicle. This includes, for example, input components like a touch-screen display, a microphone, a keyboard, a pushbutton or other control where user interface 42 receives information from a vehicle user, as well as output components like a visual display, an instrument panel, or an audio system where user interface 42 provides information to the vehicle user. In some cases, user interface 42 includes components with both input and output capabilities, such as visual and audible interfaces. The audible interface may be part of an automated voice processing system that uses voice-recognition and/or other human-machine interface (HMI) technology. User interface 42 may be a stand-alone module; it may be part of an infotainment system or part of some other module, device or system in the vehicle; it may be mounted on a dashboard or a center console (e.g., with a map provided by a navigation module, driver information center (DIC)); it may be projected onto a windshield (e.g., with a heads-up display); it may be integrated within an existing audio system; or it may simply include an electronic connection or port for connecting with a laptop or other computing device, to cite a few examples. As explained below in more detail, user interface 42 may be used to gather information from and/or to provide information to a user, such as, for example, predicted durations of time of one or more future charging processes, in a manner that facilitates the present method. Other user interfaces may be used instead, as the illustrative user interface 42 shown and described herein represents only one of the possibilities.

Navigation module 44 provides a variety of navigation-related services, including services and information that are used by the present method. Depending on the particular embodiment, navigation module 44 may be a stand-alone component or it may be integrated within some other component or system within the vehicle, such as user interface 42. The navigation module may include any combination of other components, devices, modules, etc., like a telematics unit or a GPS unit, and may use the current position of the vehicle and road- or map-data to provide route information, directions, route distances, route traveling times, traffic conditions (e.g., heavy traffic, light traffic, etc.), road conditions (e.g., road construction, lane/road closure, terrain type, etc.), information relating to charging stations (e.g., the location of and distance to charging stations within a particular geographic area or along a prescribed, pre-planned route, output charging power capabilities such charging station(s) may be configured to provide, etc.), or any other information that may be needed by the method discussed herein. This type of navigation-related information may be provided to or received from control module 40, user interface 42 and/or some other device so that it can be taken into account by the present method, as will be explained in more detail below.

Again, the preceding description of plug-in electric vehicle 10 and the drawing in FIG. 1 are only intended to illustrate one potential vehicle arrangement and to do so in a general way. Any number of other vehicle arrangements and architectures, including those that differ significantly from the one shown in FIG. 1, may be used instead.

Figure 3:
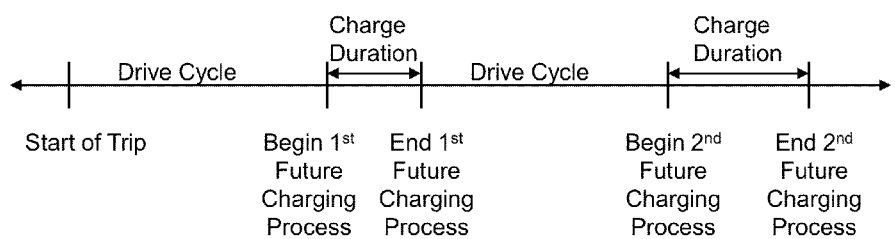
FIG. 3 depicts a timeline of a trip of a plug-in electric vehicle that requires a plurality of charging processes, the durations of which may be predicted using the method shown in FIG. 2.

Turning now to FIG. 2, there is shown an illustrative embodiment of a method 100 that may be used to predict the duration (i.e., amount of time) of one or more future charging processes (e.g., future fast charge charging processes) for a vehicle battery. As briefly described above, by predicting the duration of one or more future charging processes that may be required during a given trip, method 100 enables a user to know how long the charging process (es) will take, and thus, how long the overall trip itself will take. As such, the user will know how much time will be needed to reach a particular destination, and therefore, will be able to better plan his/her trip. Accordingly, and with reference to the timeline depicted in FIG. 3, method 100 is able to determine a respective duration of each charging process that is to be performed between driving cycles of a trip. For purposes of illustration and clarity, the description of method 100 below will be with respect to plug-in electric vehicle 10 described above. It will be appreciated, however, that the applicability of method 100 is not meant to be limited to such a vehicle configuration or arrangement; rather method 100 may find applicability with any number of vehicles having any number of configurations or arrangements, and thus, method 100 is not limited to any one particular vehicle or vehicle configuration or arrangement. Additionally, in an embodiment, control module 40 of plug-in electric vehicle 10, and processor 60 thereof, in particular, is configured to perform method 100. It will be appreciated, however, that in other embodiments, some or all of the steps of method 100 may be performed by other components of plug-in electric vehicle 10, such as, for example, battery control unit 56 or another suitable component. Accordingly, the present disclosure is not limited to method 100 being performed by any one or more particular components of plug-in electric vehicle 10.

With reference to FIG. 2, in an embodiment, method 100 includes a step 102 of estimating a future charge amount of battery 30 corresponding to the start of a future charging process. In an instance wherein method 100 is used to predict the duration of multiple charging processes, this future charging process may comprise a first of a plurality of future charging processes. In any event, the future charge amount may take a number of forms and may be estimated in a number of ways.

For example, in an embodiment, the future charge amount may comprise the estimated charge of the battery 30 at the start of the future charging process (i.e., the estimated SOC at the start of the charging process, or "$SOC_{SCP}$"), which may be determined in the manner described in greater detail below.

In other embodiments, the future charge amount may be a parameter that is derived directly or indirectly from the $SOC_{SCP}$. For instance, the estimated future charge amount may comprise the difference between the $SOC_{SCP}$ of battery 30 and a desired SOC to which battery 30 is to be charged during the future charging process (i.e., the desired SOC at the end of the charging process, or "$SOC_{ECP}$"). The $SOC_{ECP}$ may be any predetermined SOC value, such as, for example: 100%, if a full charge is desired; 80%, if a "bulk" charge is desired; or any other value. Regardless of the particular value of the $SOC_{ECP}$, the future charge amount may be the amount of energy in terms of SOC that is required to be put back into battery 30 to bring the SOC of battery 30 to the $SOC_{ECP}$. Thus, in this embodiment, the required charge amount (or "$SOC_{REQ}$") may be determined by subtracting the $SOC_{SCP}$ from the predetermined $SOC_{ECP}$ (i.e., $SOC_{REQ}=SOC_{ECP}-SOC_{SCP}$).

In yet another embodiment, the future charge amount may be in terms of the actual energy required to be put back into the battery, or the amount of kilowatt-hours required to bring the battery charge to a certain desired level, which may be determined indirectly from the $SOC_{SCP}$ of battery 30, and directly from the $SOC_{REQ}$ of battery 30 described above. More specifically, once the $SOC_{REQ}$ is determined, a data structure, such as, for example, a look-up table or predefined profile, that correlates SOC with energy may be utilized to determine a particular magnitude in terms of kWh that is required to be put back into battery 30 in order to bring battery 30 to the desired charge level. For example, if the desired $SOC_{ECP}$ is 80% and the $SOC_{SCP}$ is estimated to be 20%, it can be determined that the $SOC_{REQ}$ is 60%. Using a known relationship between SOC and energy, it can be determined that for an $SOC_{REQ}$ of 60%, 6 kWh of energy is required, and thus, in this example, the estimated charge amount would be 6 kWh.

Each of the embodiments described above requires that the $SOC_{SCP}$ of battery 30 be determined Skilled artisans will appreciate that any number of techniques known in the art may be used to estimate the $SOC_{SCP}$ of a battery, and therefore, a detailed description will not be provided. To summarize one illustrative technique, however, an algorithm that takes into account the distance (or range) to the charging station at which the future charging process is to be performed and certain battery-related information from the drive history of the vehicle (e.g., the amount of battery energy consumed over a certain amount of distance traveled (e.g., the most recent past 50 miles)) may be employed to predict what the SOC of the battery will be when the vehicle arrives at the charging station (i.e., the $SOC_{SCP}$). In a particular embodiment, in view of a known linear relationship between the energy and SOC of the battery (i.e., the amount of energy (kWh) contained in each % SOC), the $SOC_{SCP}$ may be estimated using or based on the current remaining energy of the battery, the distance to the charging station or location (i.e., drive cycle distance), and the recent long term economy of the vehicle (e.g., mph/kWh). More particularly, knowing the drive cycle distance and the economy, a determination can be made as to how much energy will be used over that drive cycle. That amount of energy may then be subtracted from the current energy level of the battery to estimate the amount of energy that will remain in the battery at the end of the drive cycle. Then, from the estimated amount of remaining energy at the end of the drive cycle, and using the known linear relationship between energy and SOC, the $SOC_{SCP}$ may be determined.

In the embodiments described above, the battery-related information that may be used to determine the $SOC_{SCP}$ may be stored in and acquired from a memory device, such as, for example, memory device 62 of control module 40 or another suitable device. With respect to the distance to the charging station, this distance may be a known or approximated distance, and may be acquired in any number of ways. For example, when the route to be taken or followed by vehicle 10 is planned and programmed into, for example, the navigation module 44 of vehicle 10, the location of one or more charging stations along the route, and the respective distances thereto or therebetween, may be obtained or otherwise determined (e.g., calculated, acquired, etc.) by navigation module 44 or another component of vehicle 10. In another instance, the user may know the particular distance to a charging station and may input that distance using, for example, user interface 42. In either instance, the actual distance—or at least a fairly close approximation of the actual distance—is known and may be used as will be described below. In certain other instances, the actual distance to the charging station may not be known, but rather may be approximated using one or more parameters relating to the battery and/or other battery-related information. For example, in an embodiment, the distance to a charging station may be based on information relating to the prior operation of the vehicle, such as, for example and without limitation, the average trip-length history of the vehicle. More particularly, the distance(s) that the vehicle traveled between two or more previous charging processes may be recorded in a memory, such as, for example, memory device 62 of control module 40 or another suitable device, and may then be averaged to approximate the distance to the charging station where the future charging process is to be performed. In another embodiment, the distance may be approximated based at least in part on the current SOC of battery 30 at the time method 100 is performed. More specifically, if an assumption can be made that vehicle 10 will be charged once the battery has been depleted to a certain established lower limit (e.g., 0% SOC or an SOC between 0% and the current SOC that the battery cannot fall below (e.g., 10-20% SOC), the difference between the current SOC and the lower limit can be converted into an approximate range using techniques well known in the art, including, for example, that or those described below, that can determine the range of a battery based at least in part on an SOC value associated with the battery. Accordingly, the distance to the charging below station may be approximated in a number of ways, including, but not limited to, those described above.

In any event, once the distance and battery-related information has been acquired or otherwise obtained, it may be used by one or more algorithms or equations known in the art to calculate an estimated $SOC_{SCP}$ of battery 30.

While the description above has been with respect to the future charge amount estimated in step 102 being represented or expressed in terms of battery SOC or required energy, the present disclosure is not meant to be so limited. Rather, in other embodiments, the future charge amount estimated in step 102 may be represented or expressed in terms of the driving range of vehicle 10, and battery 30 thereof, in particular, at the start of the charging process, which, in an embodiment, may be derived from the $SOC_{SCP}$ of battery 30. For example, in an embodiment, the charge amount may comprise an estimated remaining range of battery 30 at the start of the charging process ("$R_{SCP}$"), which may be determined in the manner described in greater detail below. In other embodiments, it may be a parameter that is derived from the $R_{SCP}$. For example, the future charge amount estimated in step 102 may comprise the difference between the $R_{SCP}$ of battery 30 and a desired range to which battery 30 is to be charged during the future charging process (i.e., the desired range at the end of the charging process, or "$R_{ECP}$"). The $R_{ECP}$ may be any predetermined range, such as, for example, a first range if a full charge is desired, a second range if a "bulk" charge is desired, or any other range. In any event, the future charge amount may be the amount of energy in terms of range (e.g., miles, kilometers, etc.) that is required to be put back into the battery to bring the battery to a charge level that is equivalent to the $R_{ECP}$. In such an embodiment, the required charge amount ("$R_{REQ}$") may be determined by subtracting the $R_{SCP}$ of battery 30 from a particular $R_{ECP}$ (i.e., $R_{REQ}=R_{ECP}-R_{SCP}$).

Each of the embodiments described above require that the $R_{SCP}$ of battery 30 be determined Skilled artisans will appreciate that any number of techniques known in the art may be used to estimate the $R_{SCP}$ of battery 30, and therefore, a detailed description will not be provided. To summarize one illustrative technique, however, an algorithm that takes into account the SOC of a battery (e.g. the $SOC_{SCP}$) and certain battery-related information from the drive history of the vehicle (e.g., the amount of battery energy consumed over a certain amount of distance traveled (e.g., the immediately past 50 miles)) may be employed to predict the range of the battery. Accordingly, in an embodiment, the $SOC_{SCP}$ of battery 30 along with certain battery-related information that may be, for example, stored in and acquired from a memory device, such as, for example, memory device 62 of control module 40 or another suitable device, may be used to estimate or determine what the range of battery 30 will be when the vehicle arrives at the charging station (i.e., the $R_{SCP}$).

While it will be appreciated in view of the foregoing that the estimated future charge amount of battery 30 may take any number of forms, for purposes of illustration and clarity only, the description below will be primarily with respect to embodiments wherein the estimated future charge amount is in terms of the SOC required to bring the charge of battery 30 up to a particular charge level, i.e., the $SO_{CREQ}$ described above, or the amount of energy in terms of range (e.g., miles, kilometers, etc.) that is required to be put back into the battery to bring the battery to a charge level that is equivalent to a particular range, i.e., the $_{RREQ}$ described above.

With continued reference to FIG. 2, method 100 further comprises a step 104 of estimating a future temperature of battery 30. Depending on the particular implementation, the future temperature may comprise either an estimated temperature corresponding to the beginning of the future charging process or that corresponding to the end of the future charging process. In an embodiment, step 104 may comprise a number of substeps. For instance, step 104 may comprise a first substep of obtaining a starting temperature ("$T_{START}$") of battery 30. In an instance where the future charging process is the first of multiple future charging processes, $T_{START}$ comprises the current temperature of battery 30 at the time method 100 is being performed. $T_{START}$ may be obtained from a number of sources, such as, for example, directly from one or more of battery sensors 54 or indirectly from, for example, battery control unit 56, memory 62 of control module 40, or another suitable component of plug-in electric vehicle 10. Alternatively, and as will be described in greater detail below, in an instance where the charging process is a second or subsequent future charging process to be performed after a first charging process, $T_{START}$ may comprise the estimated temperature corresponding to the end of an immediately preceding charging process, and not the current battery temperature at the time method 100 is performed.

In any event, step 104 may comprise a second substep of determining an anticipated increase in the temperature of battery 30 ("$T_{INCREASE}$") resulting from the anticipated occurrence of one or more events. These events may include, for example, the anticipated operation of the vehicle prior to the future charging process (e.g., the driving of the vehicle to the charging station at which the future charging process is to be performed) and, in at least certain embodiments, the anticipated performance of the future charging process itself, to cite a few possibilities. In the embodiment depicted in FIG. 4, the respective anticipated temperature increases resulting from the operation of plug-in electric vehicle 10 and the performance of the future charging process are each determined and taken into account. It will be appreciated, however, that in other embodiments, the occurrence of only one of these events, or the occurrence of one or more additional or alternative events, may be taken into account.

The anticipated temperature increase caused by the operation of the vehicle may be determined in a number of ways. In one embodiment, a data structure (e.g., a one- or multi-dimensional look-up table or predefined profile) that correlates one or more parameters or inputs with a temperature increase may be used. Any number of parameters or inputs may be utilized, including, without limitation, those described below.

One such parameter is the distance to the location at which the future charging process is to be performed (i.e., the distance to the charging station). As with determining the $SOC_{SCP}$ of battery 30 in step 102 above, this distance may be a known or an approximated distance, and may be acquired or otherwise determined in the same manner as that described above with respect to step 102, for example. Accordingly, the distance to the charging station may be acquired or obtained in a number of ways, and, in any instance, may be used as will be described below.

Another parameter that may be used is the propulsion power of plug-in electric vehicle 10. More specifically, in an embodiment, the propulsion power comprises the average propulsion power of vehicle 10 over a predetermined distance or period of time (e.g., over a certain number of previous drive cycles of vehicle 10, a certain distance traveled, etc.). The average propulsion power may be determined using techniques well known in the art and may be done so using, for example, drive history profiles stored in or on battery control unit 56, memory 62 of control module 40, or any other suitable device. The drive history profiles used to determine the average propulsion power may include information such as, for example, the accessory load on battery 30, the RMS current drawn during recent drive cycles between charges, etc. In any event, once determined, the average propulsion power may be used as will be described below.

Yet another parameter that may be used is the ambient temperature surrounding battery 30. As with the temperature of battery 30 itself, the ambient temperature may be obtained from a number of sources in a number of ways including directly from one or more of battery sensors 54 or indirectly from battery control unit 56, memory 62 of control module 40, or another suitable component of vehicle 10. It will be appreciated that the ambient temperature may or may not significantly contribute to the increase in battery temperature in that in certain instances, the increase in the battery temperature attributable to the ambient temperature may be negligible, while in other instances it may be more substantial.

Once values for each parameter that is to be taken into account in determining a battery temperature increase resulting from the operation of vehicle 10 is/are acquired or obtained, the value(s) may then be used determine the anticipated temperature increase. In an embodiment, this entails using a suitable data structure, for example, a look-up table or predefined profile, which correlates the parameter(s) with anticipated temperature increase. For example, and with reference to FIGS. 4 and 5A, assume that the known or approximated distance to a charging station and the average propulsion power are the parameters to be taken into account in determining an anticipated increase in the battery temperature resulting from the operation of the vehicle. For the sake of illustration only, assume further that the aforementioned distance is 50 miles and the average propulsion power is 11 kW. These values may be input into or looked up in the look-up table or profile illustrated in FIG. 5A, and a determination can be made that the anticipated temperature increase will be approximately 16° C. While the description above has been with respect to the use of a data structure to determine the anticipated battery temperature increase caused by the anticipated operation of vehicle 10, the anticipated temperature increase may alternatively be calculated or computed using equations or algorithms known in the art, or using other known methods or techniques.

With respect to the anticipated temperature increase caused by the performance of the future charging process, this increase may also be determined in a number of ways. As with the battery temperature increase described above, in one embodiment, a data structure (e.g., a one- or multi-dimensional look-up table, profile, etc.) that correlates one or more parameters or inputs with an anticipated temperature increase may be used. Any number of parameters or inputs may be utilized, including, without limitation, those described below.

One such parameter is the future charge amount of battery 30 estimated in step 102. Accordingly, in an embodiment wherein the future charge amount of battery 30 is taken into account, step 104 is performed subsequent to the performance of step 102. Therefore, in an embodiment, the SOC of battery 30 at the start of the future charging process (i.e., the $SOC_{SCP}$ described above) and/or the difference between the $SOC_{SCP}$ and a desired SOC (i.e., the $SOC_{REQ}$ described above)) may be used, at least in part, to determine an anticipated temperature increase of battery 30 resulting from the performance of the future charging process. In another embodiment, the range of battery 30 at the start of the future charging process (i.e., $R_{SCP}$ described above) and/or the difference between the $R_{SCP}$ and a desired range to which battery 30 is to be charged during the future charging process (i.e., the $R_{REQ}$ described above) may be used.

Another parameter that may be utilized is a default or standard amount of charging power, or the magnitude of one or more characteristics thereof (e.g., charging current, charge rate, etc.), that may be applied to battery 30 during the performance of the future charging process. In an embodiment, this may be a static, nominal value (e.g., 20 kW) that is applicable regardless of the particular charging station that may be used. The value may be determined as part of the design, manufacture, or installation the vehicle or a particular component thereof, and may be programmed into and acquired from a suitable memory device, such as, for example, memory 62 of control module 40 or another suitable device of vehicle 10. In another embodiment, however, the value may be more of a dynamic value in that it is dependent upon the particular charging station that is to be used to perform the future charging process. In such an embodiment, the value of the charging station-dependent default or standard amount of charging power or the characteristic thereof may be acquired or obtained in the same manner as that described above with respect to acquiring or obtaining a known distance to the charging station. More particularly, the navigation module 44 or another suitable device of vehicle 10 may be configured to acquire the default charging power value for one or more charging stations located along a planned route, and that or those value(s) may then be used rather than a static value programmed into a component of plug-in electric vehicle 10. Regardless of whether or not the value of the charging power or a characteristic thereof is a static value or is charging station-dependent, it may be used as will be described below.

Yet another parameter that may be used in determining the increase in battery temperature resulting from the performance of the future charging process is the ambient temperature surrounding battery 30. As was described above, the ambient temperature may be obtained from a number of sources in a number of ways including directly from one or more of battery sensors 54 or indirectly from battery control unit 56, memory 62 of control module 40, or another component of vehicle 10. As was also described above, it will be appreciated that the ambient temperature may or may not significantly contribute to the increase in battery temperature in that in certain instances, the increase in the battery temperature attributable to the ambient temperature may be negligible, while in other instances it may be more substantial.

In any event, once values for each parameter to be taken into account in determining a battery temperature increase resulting from the performance of the future charging process is/are acquired or obtained, the value(s) may then be used determine the anticipated temperature increase. In an embodiment, this entails using a suitable data structure, for example, a look-up table or predefined profile, which correlates the parameter(s) with anticipated temperature increase. For example, and with reference to FIGS. 4 and 5B, assume that the parameters to be take into account are the default or standard charging power that may be applied to battery 30 and the charge amount of battery 30 that is determined in step 102. For the sake of illustration only, assume further that the aforementioned default charging power is 20 kW and the charge amount is 70 miles. These values may be input into or looked up in the look-up table or charging power/charge amount/temperature increase profile illustrated in FIG. 5B, and a determination can be made that the anticipated temperature increase will be 15° C. While the description above has been with respect to the use of data structure to determine the anticipated battery temperature increase caused by the anticipated performance of the future charging process, it will be appreciated that the temperature increase may alternatively be calculated or computed using equations or algorithms known in the art, or using other known methods or techniques.

With continued reference to FIG. 4, once one or more anticipated increases in battery temperature due to the anticipated occurrence of one or more events has been determined, step 104 comprises a further substep of adding the anticipated battery temperature increase(s) (i.e., the total "$T_{INCREASE}$") to the starting temperature ($T_{START}$) to obtain the estimated future temperature of battery 30. Accordingly, in an instance where the estimated future battery temperature comprises that at the start of the future charging process ("$T_{SCP}$") and the temperature increase resulting from the operation of the vehicle is the only temperature increase taken into account, the future temperature (i.e., $T_{SCP}$) would be $T_{SCP}=T_{START}+T_{INCREASE}$, wherein $T_{INCREASE}$ is the anticipated temperature increase resulting from the anticipated operation of the vehicle. Alternatively, in an instance where the estimated future battery temperature comprises that at the end of the future charging process ("$T_{ECP}$") and the respective temperature increases resulting from the operation of the vehicle and the performance of the future charging process itself are both taken into account, the future temperature (i.e., $T_{ECP}$) would be $T_{ECP}=T_{START}+T_{INCREASE}$, wherein $T_{INCREASE}$ is the anticipated temperature increase resulting from both the anticipated operation of the vehicle and the performance of the future charging process.

Following the performance of steps 102 and 104, method 100 progresses to a step 106 of determining a future charging power, or a characteristic thereof (e.g., charging current or charge rate), to be applied to battery 30 during the future charging process based at least in part on the estimated future charge amount of battery 30 determined in step 102 and the estimated future temperature of battery 30 determined in step 104.

In an embodiment, the determined future charging power or characteristic thereof is representative of a charging power or characteristic thereof (e.g., maximum) that will maintain the temperature of battery 30 at or below a threshold temperature during the performance of the future charging process. The reason that it is desirable to keep the battery temperature below a threshold is that if the battery stays too high for too long, its useful life may be significantly reduced. Accordingly, the purpose of the temperature threshold is to ensure that the temperature of battery 30 does not stay too high for too long during the charging process, thereby ensuring that the useful life of battery 30 will not be significantly reduced as a result of the performance of the charging process. Therefore, in an embodiment, the temperature threshold corresponds to the maximum temperature battery 30 is allowed to reach during the future charging process, and it may be determined as part of the design, manufacture, or installation the vehicle or a particular component thereof, and may be programmed into and acquired from a suitable memory device, such as, for example, memory 62 of control module 40 or another suitable device of vehicle 10. In any event, step 106 may be performed in a number of ways.

In an embodiment wherein the estimated future temperature of battery 30 is the estimated future temperature at the start of the future charging process (i.e., $T_{SCP}$), step 106 may comprise using the $T_{SCP}$ and the estimated amount of charge at the start of the charging process in conjunction with a data structure (e.g., one- or multi-dimensional look-up table, predefined profile, etc.) that correlates these parameters with charging power (or a characteristic thereof). The output future charging power or characteristic thereof may be an empirically-derived value that is known to maintain the battery temperature at or below the threshold temperature given the estimated temperature and estimated charge amount inputs.

In an embodiment wherein the estimated future temperature of battery 30 is the estimated temperature at the end of the future charging process (i.e., $T_{ECP}$), step 106 may comprise a number of substeps. For example, in one such embodiment, step 106 may include a first substep of comparing the $T_{ECP}$ to a threshold temperature. If the comparison reveals that the $T_{ECP}$ is less than (or, in certain embodiments, equal to or less than) the threshold temperature, step 106 comprises determining a predetermined default or standard value for the future charging power, or characteristic thereof, to be applied to battery 30 during the future charging process. This default or standard value may be the same as that described above with respect to step 104, and may be acquired or obtained in the same manner as that described above. Alternatively, the default or standard value determined in step 106 may be different than that described above but may be acquired in substantially the same manner as that described above with respect to step 104.

If, however, the comparison reveals that the $T_{ECP}$ exceeds (or, in certain embodiments, meets or exceeds) the threshold temperature, step 106 comprises determining one or more future charging power values, or value(s) of a characteristic thereof, that will keep the battery temperature at or below the temperature threshold during the future charging process. This may be accomplished in a variety of ways. For example, in an embodiment, a data structure (e.g., a multi-dimensional look-up table or predefined profile) that correlates the threshold temperature and the future charge amount of battery 30 determined in step 102 with charging power, or a characteristic thereof, may be used. More specifically, the future charge amount from step 102—which may comprise, for example, the $SOC_{REQ}$, $R_{REQ}$, etc. described above—may be looked up or input into the look-up table or profile and one or more charging power values (or values of a characteristic thereof) may be determined that will keep the battery temperature below, at, or at least substantially close to the temperature threshold during the future charging process. For example, and with reference to FIGS. 4 and 5C, assume for the sake of illustration only that $T_{ECP}=46°$ C., the temperature threshold is 40° C., and the charge amount from step 102 in terms of range is $R_{REQ}=40$ miles. Using the look-up table or profile in FIG. 5C, a charging power of 20 kW may be applied to battery 30 until the battery is charged to a level that is equivalent to a range of just less than 30 miles, at which point the battery temperature reaches 40° C. Accordingly, a first future charging power of 20 kW may be determined to be applied to battery 30 at least during a first portion of the future charging process. In this example, however, because the battery needs to be charged to a level that is equivalent to a range of 40 miles, and because 20 kW can only be used to charge battery 30 to the equivalent of 30 miles without exceeding (or at least exceeding by more than an acceptable amount) the temperature threshold, a second, lower future charging power must be determined to complete the charging process, while also keeping the battery temperature under or as close to the threshold temperature as possible. In this example, a second future charging power of 15 kW may be determined to adequately complete the future charging process. While the description above has been with respect to the use of data structure to determine one or more future charging power values or values of characteristic(s) thereof, it will be appreciated that this or these values may alternatively be calculated or computed using equations or algorithms known in the art, or using other known methods or techniques.

Once one or more future charging power values, or values of one or more characteristics thereof, are determined in step 106, method 100 may progress to a step 108 of predicting or estimating the duration of the future charging process. In an embodiment, this prediction is based at least in part on the future charge amount of battery 30 estimated in step 102 and the future charging power or characteristic thereof determined in step 106. Step 108 may be performed in a variety of ways. For example, in an embodiment, a data structure (e.g., a multi-dimensional look-up table or predefined profile) that correlates future charge amount and future charging power (or one or more characteristics thereof) with predicted charging process duration may be used. More specifically, the future charge amount from step 102—which may comprise, for example, the $SOC_{REQ}$, $R_{REQ}$, etc. described above—and the determined future charging power value (or the value of a characteristic thereof) from step 106 may be looked up or input into the look-up table or predefined profile and a duration of the future charging process may be obtained. For example, and with reference to FIGS. 4 and 5D, assume for the sake of illustration only that the charge amount from step 102 in terms of range is $R_{REQ}=10$ miles and that a single future charging power of 10 kW was determined in step 106. Using the look-up table or profile in FIG. 5D, a duration of 20 minutes for the future charging process may be predicted. In another example, assume now that the charge amount from step 102 in terms range is $R_{REQ}=80$ miles and that in step 106, a first future charging power of 20 kW was determined for charging battery 30 up to 60 miles (i.e., 0-60 miles) and a second future charging power of 10 kW was determined for charging battery 30 the remaining 19 miles (i.e., miles 61-80). Using the look-up table or profile in FIG. 5D, a duration of 40 minutes can be predicted for the first portion of the charging process (i.e., charging to 60 miles at 20 kW) and a duration of 20 minutes can be predicted for the second portion of the charging process (i.e., charging from mile 61 to mile 80 at 10 kW), resulting in a total future charging process duration prediction of 60 minutes. While the description above has been with respect to the use of a data structure to predict the duration of a future charging process, it will be appreciated that this or these values may alternatively be calculated or computed using equations or algorithms known in the art, or using other known methods or techniques.

In any event, once the duration of the future charging process has been predicted, it may be displayed to the user via an appropriately configured display device, such as, for example, user interface 42 of vehicle 10. The particular manner in which the prediction may be visually presented or displayed may vary. For example, the prediction may presented or displayed in the form of a bar graph or some other graphical representation. Additionally, or in the alternative, the prediction may be presented or displayed in an alpha, a numeric, or an alphanumeric form (e.g., "Duration of Future Charging Process #1—20 minutes"). Additionally, or alternatively, the prediction may be displayed in an audible manner via, for example, a speaker located within plug-in electric vehicle 10. Accordingly, skilled artisans will appreciate that the present disclosure is not limited to any particular means or manner by or in which the predicted duration of a future charging process is presented or displayed to the user/occupant(s) of the vehicle.

Once a duration for a future charging process has been predicted in the manner described above, method 100 may loop back to step 102 and may be repeated for either the same future charging process or for one or more subsequent future charging process.

In the first instance, method 100 may be operative to predict different durations for a single future charging process, each of which corresponds to a different desired level to which battery 30 may be charged during the future charging process. More specifically, in an embodiment, and as described above, the charge amount estimated in step 102 may comprise one of the difference between an estimated SOC at the start of the future charging process ($SOC_{SCP}$) and a desired SOC to which battery 30 is to be charged during the future charging process ($SOC_{ECP}$), and the difference between a range in terms of miles at the start of the future charging process ($R_{SCP}$) and a desired range to which battery is to be charged during the future charging process ($R_{ECP}$). In an embodiment, method 100 may be performed for different values of either $SOC_{ECP}$ or $R_{ECP}$. For example, method 100 may be performed for charging battery 30 to bulk (e.g., SOC of 80%) during the future charging process, and then performed again for a full charge (e.g., SOC 100%) for the same future charging process. Each of the predicted durations may then be displayed for the user see and allow him/her to determine how much to charge battery 30 during that future charging process. This would allow the user to weigh the advantages and disadvantages of a charging process that may charge battery 30 less but also take less time, versus a charging process that may charge battery 30 more but also take more time.

In the second instance, method 100 may be operative to predict the duration of one or more subsequent charging processes that are separated by one or more driving cycles. More specifically, and with reference to FIG. 3, if a particular trip requires two or more charging processes separated by driving cycles, method 100 can be repeated a number of times that is equal to the number of charging processes to predict a duration of each future charging process. In such an embodiment, one difference between predicting a duration for a first future charging process of a trip and a second or subsequent future charging process of the same trip is the particular temperature that is used as the starting temperature of battery 30 ($T_{START}$) in step 104 to estimate the future temperature of battery 30 (e.g., either temperature at the start of the second future charging process ($T_{SCP}$) or the temperature at the end of the second future charging process ($T_{ECP}$), depending on the particular implementation). More particularly, unlike the iteration of the method for the first future charging process wherein $T_{START}$ used in step 104 is the temperature of battery 30 at the time the method is performed, in the iteration of the method for the second, subsequent future charging process, $T_{START}$ may be the estimated end-of-charge battery temperature $T_{ECP}$ for the first future charging process (i.e., the immediately preceding charging process). In other words, and as illustrated in FIG. 4, the $T_{ECP}$ estimated in step 104 of a first iteration of method 100 is used as the starting temperature $T_{START}$ in the next iteration of method 100 that is performed for a future charging process that immediately follows the first future charging process. However, in an instance where the estimated $T_{ECP}$ is greater than the threshold described elsewhere above, in an embodiment, the temperature that may be used for $T_{START}$ in the next iteration of method 100 may be the threshold value itself (or another value) which may be more accurate than the estimated $T_{ECP}$ since the temperature of battery 30 is maintained at or below the temperature threshold during the performance of the immediately preceding charging process, and thus, should not reach the estimated $T_{ECP}$. In any event, and with reference to FIG. 3, after a duration is predicted for the first illustrated future charging process, a duration may be predicted for the second illustrated future charging process in which, generally speaking, the estimated $T_{ECP}$ from the first iteration of the method is used as $T_{START}$ in step 104 of the second iteration of the method.

Whether or not method 100 is repeated for the same future charging process or to predict the duration of multiple charging processes as described above, in an embodiment, it may additionally or alternatively be repeated any number of times (e.g., in accordance with a particular rate) in order to fine tune or more precisely predict the charging duration(s) of the future charging process(es). More particularly, method 100 may be performed a first time prior to the vehicle embarking on a trip in order to give the user of the vehicle an idea of the overall amount of time that the trip may take. Then, as the vehicle travels and the various parameters described above that may impact the charging process duration prediction (e.g., battery SOC, battery temperature, average propulsion power, ambient temperature, distance to the charging station, etc.) change, method 100 may be repeated any number of times to take into account these changes and to adjust, in substantially real-time, the predicted charging process duration(s) accordingly. As a result, more precise and accurate predictions can be made.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for predicting a duration of a future charging process for a vehicle battery in a plug-in electric vehicle, comprising the steps of:
    estimating a future charge amount of the vehicle battery corresponding to a start of the future charging process;
    estimating a future temperature of the vehicle battery;
    determining a future charging power or a characteristic thereof to be applied to the vehicle battery during the future charging process, wherein the future charging power or the characteristic thereof is based on the estimated future charge amount and the estimated future battery temperature and is representative of a charging power or characteristic thereof that will maintain the temperature of the vehicle battery at or below a threshold temperature during the future charging process;
    predicting the duration of the future charging process based on the estimated future charge amount and the determined future charging power or characteristic thereof; and
    presenting the predicted duration of the future charging process to a user of the plug-in electric vehicle via a user interface.

2. The method of claim 1, wherein the future charge amount comprises one of:
    a state-of-charge (SOC) of the vehicle battery at the start of the future charging process;
    a difference between an estimated SOC of the vehicle battery at the start of the future charging process and a predetermined SOC to which the vehicle battery is to be charged during the future charging process;
    a distance range of the vehicle corresponding to the current state of the vehicle battery; and
    a difference between an estimated distance range of the vehicle and a predetermined distance range to which the vehicle battery is to be charged during the future charging process.

3. The method of claim 1, wherein the step of estimating a future vehicle battery temperature comprises:
    obtaining a starting temperature of the vehicle battery;
    determining an anticipated temperature increase in the vehicle battery temperature resulting from an anticipated occurrence of one or more events; and
    adding the starting temperature and the anticipated temperature increase together to obtain the estimated future vehicle battery temperature.

4. The method of claim 3, wherein the estimated future battery temperature is the estimated future battery temperature at an end of an anticipated vehicle operation, and further wherein the step of determining an anticipated temperature increase in the vehicle battery temperature comprises determining an anticipated temperature increase resulting from the anticipated vehicle operation prior to the future charging process.

5. The method of claim 4, wherein the step of determining an anticipated temperature increase resulting from the operation of the vehicle comprises doing so based on one or more of:
    a current state-of-charge (SOC) of the vehicle battery;
    a known distance to a location where the future charging process is to be performed;
    a propulsion power of the vehicle; and
    an ambient temperature surrounding the vehicle battery.

6. The method of claim 5, wherein the propulsion power of the vehicle comprises an average propulsion power of the vehicle over a predetermined distance or amount of time.

7. The method of claim 3, wherein the estimated future battery temperature is the estimated future battery temperature at an end of the future charging process, and further wherein the step of determining an anticipated increase in the vehicle battery temperature comprises determining an anticipated temperature increase resulting from an anticipated performance of the future charging process.

8. The method of claim 7, wherein the step of determining an anticipated temperature increase resulting from the performance of the future charging process comprises doing so based on one or more of:
    the estimated future charge amount of the battery;
    the difference between the estimated future charge amount of the battery and a desired charge amount;
    a default amount of charging power or a characteristic thereof that may be applied to the vehicle battery during the performance of the future charging process; and
    an ambient temperature surrounding the vehicle battery.

9. The method of claim 3, wherein the future charging process is a second future charging process that is to be performed subsequent to a first future charging process, and further wherein the starting temperature obtained in the obtaining step comprises an anticipated temperature of the vehicle battery corresponding to an end of the first future charging process.

10. The method of claim 1, wherein each of the steps is performed prior to the vehicle battery being plugged-in at a location where the future charging process is to be performed.

11. A method for predicting a duration of a future charging process for a vehicle battery in a plug-in electric vehicle, comprising the steps of:
    estimating a future charge amount of the vehicle battery corresponding to a start of the future charging process;
    estimating a future temperature of the vehicle battery corresponding to an end of the future charging process;
    determining a future charging power or a characteristic thereof to be applied to the vehicle battery during the future charging process based on the estimated future charge amount and the estimated future temperature;
    predicting the duration of the future charging process based on the estimated future charge amount and the determined future charging power or characteristic thereof; and
    presenting the predicted duration of the future charging process to a user of the plug-in electric vehicle via a user interface.

12. The method of claim 11, wherein the future charging power or the characteristic thereof is representative of a maximum charging power or characteristic thereof that will maintain the temperature of the battery at or below a threshold temperature during the future charging process.

13. The method of claim 11, wherein the future charge amount comprises one of:
    a state-of-charge (SOC) of the vehicle battery at the start of the future charging process;
    a difference between an estimated SOC of the vehicle battery at the start of the future charging process and a predetermined SOC to which the vehicle battery is to be charged during the future charging process;
a distance range of the vehicle corresponding to the current state of the vehicle battery; and
a difference between an estimated distance range of the vehicle and a predetermined distance range to which the vehicle battery is to be charged during the future charging process.

14. The method of claim 11, wherein the step of estimating a future vehicle battery temperature comprises:
obtaining a starting temperature of the vehicle battery;
determining an anticipated temperature increase in the vehicle battery temperature resulting from an anticipated occurrence of one or more events; and
adding the starting temperature and the anticipated temperature increase together to obtain the estimated future vehicle battery temperature.

15. The method of claim 14, wherein the step of determining an anticipated temperature increase in the vehicle battery temperature comprises one or more of:
determining an anticipated temperature increase resulting from an anticipated operation of the vehicle prior to the future charging process; and
determining an anticipated temperature increase resulting from an anticipated performance of the future charging process.

16. The method of claim 14, wherein the future charging process is a second future charging process that is to be performed subsequent to a first future charging process, and further wherein the starting temperature obtained in the obtaining step comprises an anticipated temperature of the vehicle battery corresponding to the end of the first future charging process.

17. The method of claim 11, wherein each of the steps is performed prior to vehicle battery being plugged-in at a location where the future charging process is to be performed.

18. A method for predicting a duration of a future charging process for a vehicle battery in a plug-in electric vehicle, comprising the steps of:
determining a distance to a charging location at which the future charging process is to be performed using a planned route to be followed by the plug-in electric vehicle, the distance to the charging location is determined with the use of a navigation module in the plug-in electric vehicle;
estimating a future charge amount of the vehicle battery corresponding to a start of the future charging process based at least in part on the distance to the charging location;
estimating a future temperature of the vehicle battery based at least in part on the distance to the charging location;
determining a future charging power or a characteristic thereof to be applied to the vehicle battery during the future charging process, wherein the future charging power or characteristic thereof is based on the estimated future charge amount and the estimated future temperature and is representative of a charging power or characteristic thereof that will maintain the temperature of the battery at or below a threshold temperature during the future charging process; and
predicting a duration of the future charging process based on the estimated future charge amount and the determined future charging power or characteristic thereof.

19. The method of claim 18, wherein each of the steps is performed prior to the vehicle battery being plugged-in at a charging location.

20. The method of claim 18, wherein the step of determining a distance to a charging location at which the future charging process is to be performed comprises acquiring the distance from a navigation module of the vehicle.

* * * * *